United States Patent [19]

Eguchi et al.

[11] Patent Number: 4,520,987
[45] Date of Patent: Jun. 4, 1985

[54] STRUCTURE OF SUPPORTING A STEPPING MOTOR

[75] Inventors: Yasukata Eguchi; Susumu Hanyu; Hideaki Takenoya; Mikio Inamori, all of Tokyo, Japan

[73] Assignee: Janome Sewing Machine Co. Ltd., Tokyo, Japan

[21] Appl. No.: 389,231

[22] Filed: Jun. 17, 1982

[30] Foreign Application Priority Data

Jun. 15, 1981 [JP] Japan ............................ 56-86797[U]

[51] Int. Cl.³ .............................................. F16M 1/00
[52] U.S. Cl. ..................................... 248/635; 248/605; 248/638; 310/91
[58] Field of Search ............... 248/638, 637, 605, 606, 248/632, 635; 310/91, 90

[56] References Cited

U.S. PATENT DOCUMENTS

| 2,575,858 | 11/1951 | Bennett | 248/606 |
| 2,832,905 | 4/1958 | Clay | 310/90 |
| 3,037,822 | 6/1962 | Plummer | 310/90 |
| 3,270,222 | 8/1966 | Shaffer | 310/91 |
| 3,330,515 | 7/1967 | Janssen et al. | 248/606 |
| 3,685,773 | 8/1972 | Otto | 248/606 |

FOREIGN PATENT DOCUMENTS 0047908 8/1979 Fed. Rep. of Germany ...... 248/638

Primary Examiner—William H. Schultz
Assistant Examiner—Ramon O. Ramirez
Attorney, Agent, or Firm—Michael J. Striker

[57] ABSTRACT

A rotor shaft of a stepping motor is elastically held via cushions with respect to a housing of machinery, thereby to reduce disorders or noises to be caused in the stepping motor and exactly position an object to be adjusted.

3 Claims, 4 Drawing Figures

FIG_1
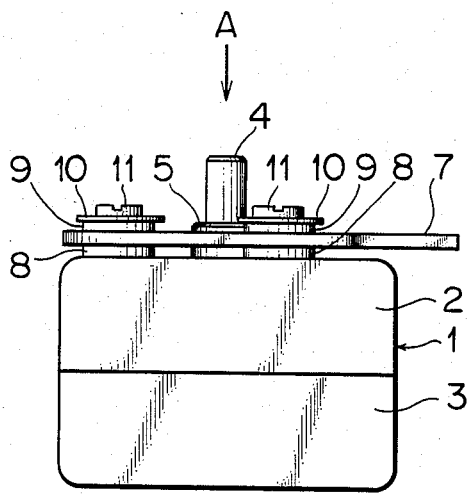
FIG_3
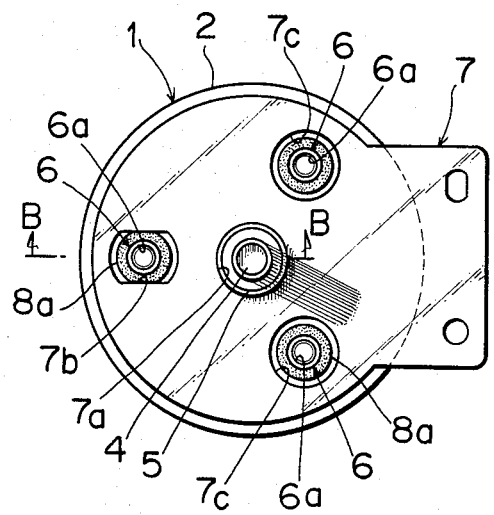
FIG_2
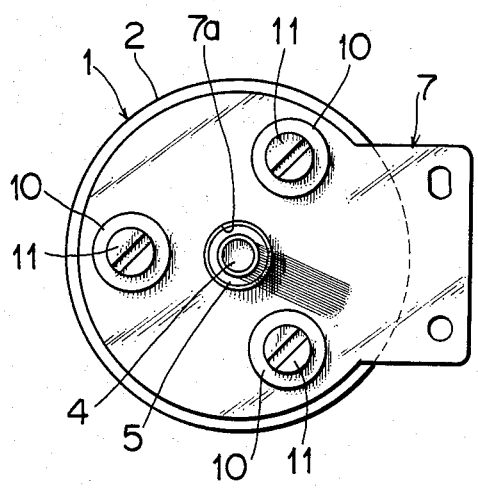
FIG_4
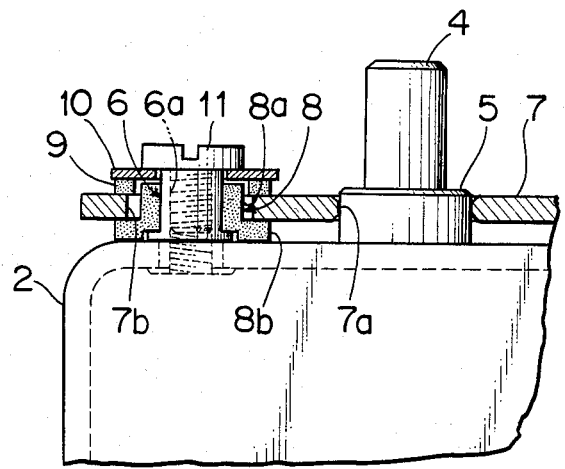

STRUCTURE OF SUPPORTING A STEPPING MOTOR

TECHNICAL FIELD OF THE INVENTION

A stepping motor (also called as stepper motor) rotates in short and essentially uniform angular movements rather than continuously, and high precision is required to supporting of the stepping motor to a machine, so that it rotates stepwise, e.g., 30°, 45° or 90°, by input pulse.

The invention relates to a structure for supporting the stepping motor to the machine, and more particularly to a supporting structure which exactly reduces disorder play, noises and other disadvantages generally caused in the stepping motor. The stepping motor is incorporated in the machinery in order to adjusts positioning of an object at high precision.

BACKGROUND OF THE INVENTION

The stepping motor is used, for example, with a sewing machine in order to adjust needle swinging amplitude or fabric feed. The stepping motor is often given external force intentionally or incidentally, shocks during transportation or reaction of a stator effected with stepping movement with respect to movement of a rotor shaft while driving the stepping motor. For measures to those matters, a first requirement is to reduce lag in a center of the rotor shaft, and a second requirement is to reduce noises caused by driving the stepping motor. However, it is generally difficult to satisfy the first and second requirements at the same time. If the stepping motor were rigidly held to the machine housing through an attaching plate, the first requirement would be satisfied, but the second requirement could not be satisfied, since action of the rotor shaft generates reaction of the stator during operation of the stepping motor and makes considerable noises.

On the contrary, if the stepping motor were elastically held to the attaching plate fixed to the machine housing via a plurality of elastic members, the second requirement could be satisfied, but compression rates of said elastic members would be much more sporadic if tolerance between cores of opposing members were not exactly observed, and the above mentioned disadvantages would be caused.

SUMMARY OF THE INVENTION

An object of the invention is to elastically hold the housing of the stepping motor via a plurality of cushion members in a direction of the rotor shaft with respect to the supporting plate secured to the housing of the machinery, and elastically hold the housing of the stepping motor by means of one of said cushions in rotating direction of the rotor shaft around fitting portion between a bearing and a hole of the rotor shaft. In such manner, the present invention could reduce disorder caused in the prior art with respect to the compression rate of the cushions in the axial direction of the rotor, and the compression rate of the cushion in the rotating direction between the supporting member and the positioning hole, and the invention can secure the precision in the supporting position of the housing to the supporting plate with little disorder in the machinery.

BRIEF DESCRIPTION OF THE DRAWING

FIG. 1 is a side view showing attachment of the housing and the attaching plate, FIG. 2 is a view seen from an arrow A in FIG. 1, FIG. 3 is a view showing an embodiment removing a washer and a cushion material of ring shape from that in FIG. 2, and, FIG. 4 is a cross sectional view seen from B—B line in FIG. 3.

DETAILED DESCRIPTION OF THE PREFERRED EMBODIMENTS

In FIGS. 1 to 4, the reference numeral 1 is a stepping motor, 2 and 3 are housings secured to a stator (not shown). The housing 2 is fixed with a bearing 5 of a rotor shaft 4 and with a plurality of mounts 6 (three members in the instant embodiment). The mounts 6 are each defined with female thread 6a. The numeral 7 shows a supporting plate to be secured to the housing of a machinery, which is formed with a hole 7a for fitting the bearing 5 at high precision, a positioning hole 7b facing to one of the mounts 6, and a plurality of supporting holes 7c (two holes in this embodiment). The numeral 8 shows a cushion member comprising a tubular portion 8a and a flange 8b. 9 is a ring shaped cushion, 10 is a washer and 11 is a screw. The positioning hole 7b is made larger in size than an outer diameter of the tubular portion 8a of the cushion member 8 in radial direction of the rotor shaft. The rotor shaft 4 is formed to be smaller than the outer diameter of the tubular portion 8a in circumferential direction of the rotor shaft 4. In this embodiment, the positioning hole 7b is defined as oblong as seen in FIG. 3.

Inner diameter of the supporting hole 7c is formed to be larger than outer diameter of the tubular portion 8a of the cushion member 8. Under a condition of holding the housing 2 and the supporting plate 7, if positioning relation of those relative parts were within proper processing tolerance, the inner diameter of the supporting hole 7c and the outer diameter of the tubular portion 8a would be non contacted.

In positioning of the housing 2 with respect to the supporting plate 7, the rotor shaft 4 is elastically held by the screw 11 screwed into the mount 6 due to the cushion 9 intervening between the washer 10 and the attaching plate 7, and the flange portion 8b of the cushion 8 between the attaching plate 7 and the housing 2. With respect to the plan face crossing with an axis of the rotor 4, the rotor shaft 4 is further elastically held by one of the tubular portions 8a of the cushions 8 placed between the mount 6 and the positioning hole 7b around the fitting portion of the bearing 5 and the hole 7a.

Having been composed as mentioned above, the present invention could reduce disorder play caused in the machinery, of the compression rate of the cushion in the axial direction of the rotor and the compression rate of the cushion in the rotation direction between the mount and the positioning hole, and the invention could secure the precision in the attaching position of the housing to the supporting plate with little disorder in the machinery.

Since the supporting position is stable against the external force subjecting to the stepping motor after having been set and adjusted, the stepping movement caused by reaction of the stator which drives the stepping motor, may be elastically absorbed within scope where the positioning precision of the object to be controlled is fully satisfied by one of the tubular portions of the cushions at the fitting portion of the bearing and the hole of the rotor shaft, thereby to reduce noise of the stepping motor.

We claim:

1. A mounting for supporting a stepping motor of a machine, the stepping motor having an electric input pulse stepwise rotated rotor shaft rotatably arranged in a housing and partly projecting out of the housing through a bearing provided on one face of the housing, comprising:

a plurality of inner threaded mounts attachable to the one face of the housing radially of the bearing;

cushion means formed to surround each of said mounts;

a support plate having a plurality of openings adapted to receive said mounts and cushion means with a radial clearance while said cushion means clamps a portion of said support plate surrounding each of said holes, a separate single opening formed to receive the bearing, and one of said plurality of openings being formed so that the housing is prevented from moving angularly with respect to said bearing receiving opening; and fastening means including washer means oriented to press against said cushion means as a fastening screw is screwed into each of said mounts causing said cushion means to clamp said support plate between said washer means and the housing.

2. The mounting as defined in claim 1, wherein said mounts are provided at three positions with a predetermined space therebetween radially of said bearing receiving opening, and said openings receiving said mounts being provided at three positions of said support plate with a predetermined space therebetween radially of said bearing receiving opening.

3. The mounting as defined in claim 1, wherein said cushion means includes a ring-shaped cushion element and a cylindrical cushion element having a flange.

* * * * *